United States Patent
Victor et al.

(10) Patent No.: US 9,250,094 B2
(45) Date of Patent: Feb. 2, 2016

(54) NAVIGATION SYSTEM WITH PATH PREDICTION AND METHOD OF OPERATION THEREOF

(75) Inventors: Autumn Claire Victor, Gilroy, CA (US); Yi-Chung Chao, San Jose, CA (US)

(73) Assignee: TELENAV, INC., Sunnyvale, CA (US)

( * ) Notice: Subject to any disclaimer, the term of this patent is extended or adjusted under 35 U.S.C. 154(b) by 1831 days.

(21) Appl. No.: 12/365,151

(22) Filed: Feb. 3, 2009

(65) Prior Publication Data
US 2010/0198496 A1    Aug. 5, 2010

(51) Int. Cl.
G01C 21/00    (2006.01)
G01C 21/36    (2006.01)

(52) U.S. Cl.
CPC .................................. *G01C 21/3655* (2013.01)

(58) Field of Classification Search
USPC ............... 701/200, 201–211; 340/988, 995.1, 340/995.28
See application file for complete search history.

(56) References Cited

U.S. PATENT DOCUMENTS

| | | | |
|---|---|---|---|
| 5,550,538 A | * | 8/1996 | Fujii ................ G08G 1/096827 340/990 |
| 6,192,312 B1 | | 2/2001 | Hummelsheim |
| 6,529,822 B1 | | 3/2003 | Millington et al. |
| 6,615,135 B2 | * | 9/2003 | Davies .................. G01C 21/30 342/357.31 |
| 6,707,421 B1 | | 3/2004 | Drury et al. |
| 6,807,483 B1 | * | 10/2004 | Chao ...................... G01C 21/00 340/995.12 |
| 6,847,889 B2 | | 1/2005 | Park et al. |
| 6,968,272 B2 | | 11/2005 | Knockeart et al. |
| 7,409,288 B1 | | 8/2008 | Krull et al. |
| 7,480,562 B2 | * | 1/2009 | Kustosch ........... G01C 21/3697 180/14.4 |
| 2005/0251335 A1 | | 11/2005 | Ibrahim |
| 2006/0116818 A1 | | 6/2006 | Chao et al. |
| 2006/0276962 A1 | | 12/2006 | Yoshioka et al. |
| 2008/0177460 A1 | | 7/2008 | Blackwood et al. |

* cited by examiner

*Primary Examiner* — Luke Gilligan
*Assistant Examiner* — Edward Winston, III
(74) *Attorney, Agent, or Firm* — IP Investment Law Group

(57) ABSTRACT

A method of operation of a navigation system includes: detecting a location reading; selecting a route having a current edge with an endpoint and a shape point; predicting a navigation instruction based on a calculation with the location reading, the shape point, and a time delay for the calculation; and displaying the navigation instruction on a device.

20 Claims, 7 Drawing Sheets

NAVIGATION SYSTEM WITH PATH PREDICTION AND METHOD OF OPERATION THEREOF

TECHNICAL FIELD

The present invention relates generally to a navigation system, and more particularly to a navigation system with path prediction.

BACKGROUND ART

Modern portable consumer and industrial electronics provide increasing levels of functionality to support modern life including location-based information services. This is especially true for client devices such as navigation systems, cellular phones, portable digital assistants, and multifunction devices.

Numerous technologies have been developed to utilize this new functionality. Some of the research and development strategies focus on new technologies. Others focus on improving the existing and mature technologies. Research and development in the existing technologies can take many different directions.

As users adopt mobile location based service devices, new and old usage begin to take advantage of this new device space. There are many solutions to take advantage of this new device opportunity. One existing approach is to use location information to provide navigation services, such as a global positioning service (GPS) navigation system for a mobile device.

In response to consumer demand, navigation systems are providing ever-increasing amounts of information requiring these systems to handle more and more data. This information includes map data, business data, local weather, and local driving conditions. Navigation systems in moving vehicles are required to provide information relative to their current location, and to update that information as the vehicle changes location. However, the information is not provided instantaneously, and this can cause complications for a navigation system. The information needs to be relevant to the location where the information is provided, which may be different from where it is first requested. The demand for more information and the need to remain current continue to challenge the providers of navigation systems.

Thus, a need remains for a navigation system to provide information relative to where a system is expected to be, rather than where it is located at the time of request. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: detecting a location reading; selecting a route having a current edge with an endpoint and a shape point; predicting a navigation instruction based on a calculation with the location reading, the shape point, and a time delay for the calculation; and displaying the navigation instruction on a device.

The present invention provides a navigation system including: a location unit for detecting a location reading; a routing module, coupled with the location unit, for selecting a route having a current edge with an endpoint and a shape point; a prediction module, coupled with the routing module, for predicting a navigation instruction based on a calculation with the location reading, the shape point, and a time delay for the calculation; and a guidance and display module, coupled with the prediction module, for displaying the navigation instruction on a device.

Certain embodiments of the invention have other aspects in addition to or in place of those mentioned above. The aspects can become apparent to those skilled in the art from a reading of the following detailed description when taken with reference to the accompanying drawings.

BEST MODE FOR CARRYING OUT THE INVENTION

Figure 1:
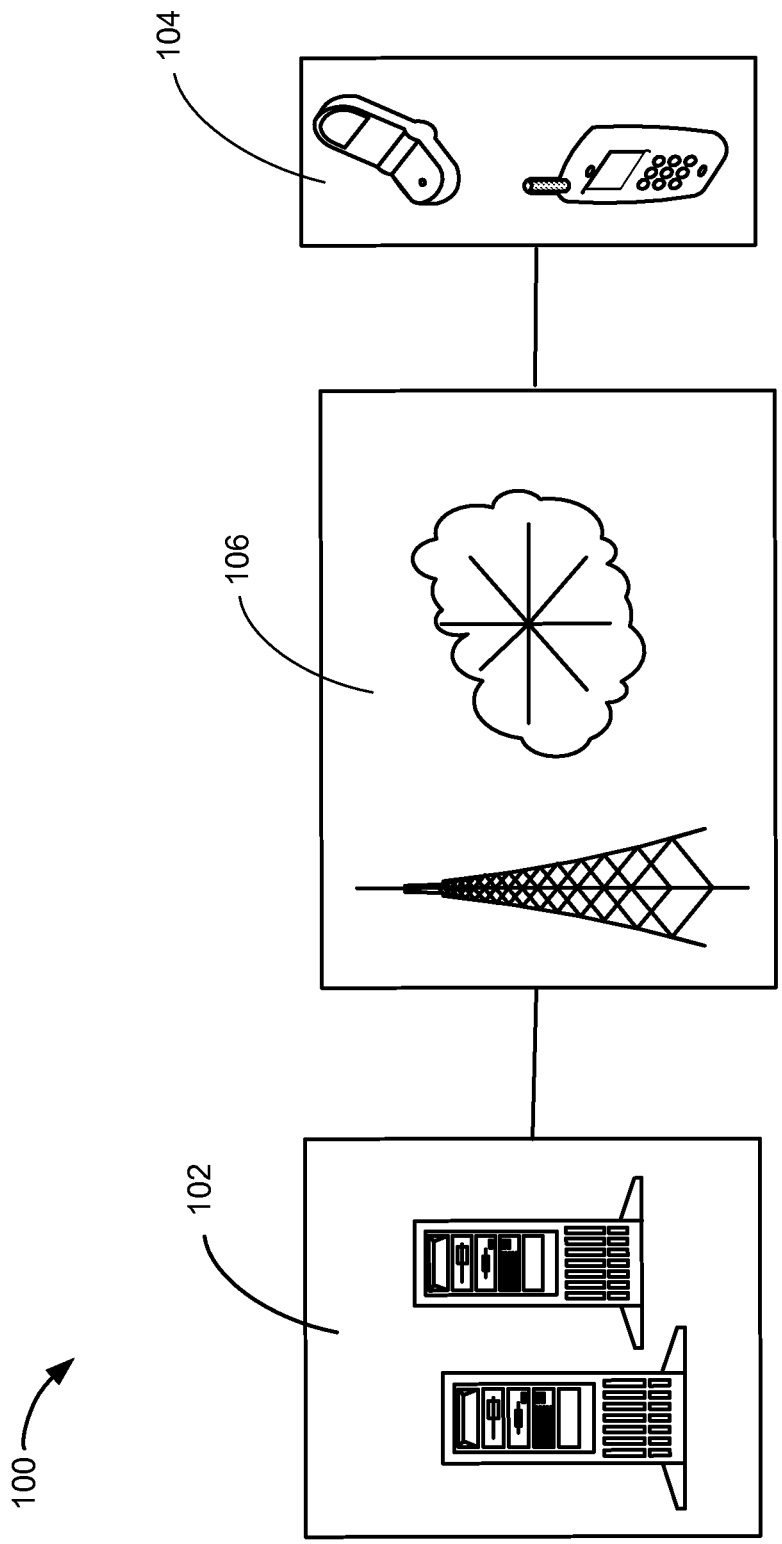
FIG. 1 is an example of an environment using an embodiment of the present invention.

The following embodiments are described in sufficient detail to enable those skilled in the art to make and use the invention. It is to be understood that other embodiments would be evident based on the present disclosure, and that system, process, or mechanical changes can be made without departing from the scope of the present invention.

In the following description, numerous specific details are given to provide a thorough understanding of the invention. However, it can be apparent that the invention can be practiced without these specific details. In order to avoid obscuring the present invention, some well-known circuits, system configurations, and process locations are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (x, y), where x and y are two ordinates that define the geographic location, i.e., a position of a user.

The navigation information is presented by longitude and latitude related information. The navigation information also includes a velocity element comprising a speed component and a direction component.

The term "navigation routing information" referred to herein is defined as the routing information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, or a combination thereof.

Referring now to FIG. 1, therein is shown an example of an environment 100 using an embodiment of the present invention. The environment 100 applies to any embodiment of the present invention described later. The environment 100 includes a first device 102, such as a server or client. The first device 102 can be linked to a second device 104, such as a client or server, with a communication path 106, such as a network.

The first device 102 can be any of a variety of centralized or decentralized computing devices. For example, the first device 102 can be a computer, a computer in a grid computing pool, a virtualized computer, a computer in a cloud computing pool, or a computer in a distributed computing topology. The first device 102 can include routing functions or switching functions for coupling with the communication path 106 to communicate with the second device 104.

The second device 104 can be of any of a variety of mobile devices. For example, the second device 104 can be a cellular phone, personal digital assistant, a notebook computer, or other multi-functional mobile communication or entertainment devices having means for coupling to the communication path 106.

The communication path 106 can be a variety of networks. For example, the communication path 106 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 106. Ethernet, digital subscriber line (DSL), fiber to the home (FTTH), and plain old telephone service (POTS) are examples of wired communication that can be included in the communication path 106.

Further, the communication path 106 can traverse a number of network topologies and distances. For example, the communication path 106 can include personal area network (PAN), local area network (LAN), metropolitan area network (MAN), and wide area network (WAN).

For illustrative purposes, the first device 102 is shown in a single location, although it is understood that the server can be centralized or decentralized and located at different locations. For example, the first device 102 can represent real or virtual servers in a single computer room, distributed across different rooms, distributed across different geographical locations, embedded within a telecommunications network, virtualized servers within one or more other computer systems including grid or cloud type computing resources, or in a high powered client device.

Further for illustrative purposes, the environment 100 is shown with the second device 104 as a mobile computing device, although it is understood that the second device 104 can be different types of computing devices. For example, the second device 104 can be a mobile computing device, such as notebook computer, another client device, or a different type of client device.

Yet further for illustrative purposes, the environment 100 is shown with the first device 102 and the second device 104 as end points of the communication path 106, although it is understood that the environment 100 can have a different partition between the first device 102, the second device 104, and the communication path 106. For example, the first device 102, the second device 104, or a combination thereof can also function as part of the communication path 106.

Figure 2:
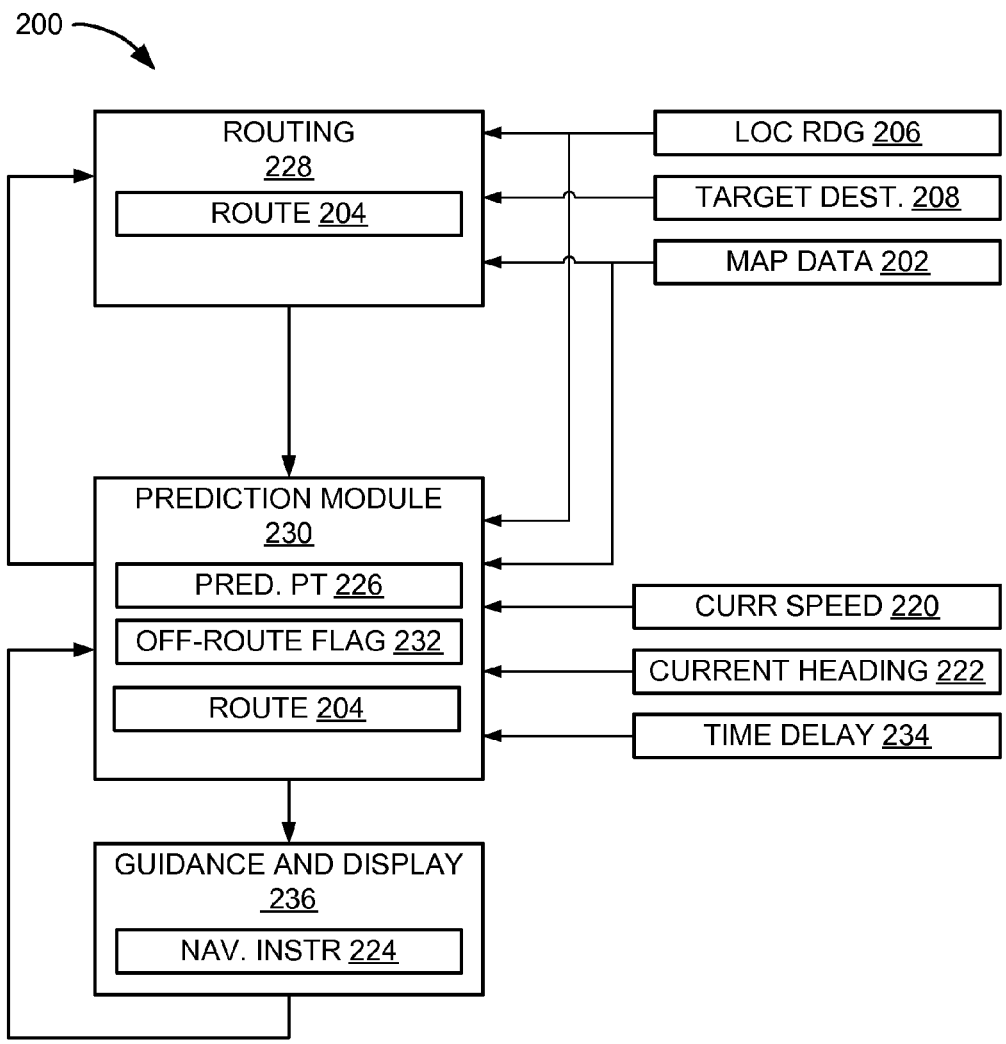
FIG. 2 is a flow chart of a navigation system with path prediction in a first embodiment of the present invention.

Referring now to FIG. 2, therein is shown a flow chart of a navigation system 200 with path prediction in a first embodiment of the present invention. The navigation system 200 can receive map data 202, detect a location reading 206, and select a route 204 to a target destination 208. The navigation system 200 can receive a current speed 220 and a current heading 222, and generate a navigation instruction 224 consistent with the route 204 and a predicted point 226 on the route 204. The predicted point 226 is a location where the navigation system 200 is expected to be after a time delay 234. The navigation system 200 can also display the navigation instruction 224. A routing module 228 can receive the map data 202, the location reading 206, the predicted point 226 and the target destination 208. The location reading 206 can be generated by another module of the navigation system 200, or can be received from another device. The routing module 228 can select the route 204 from the location reading 206 as the origin or starting point of the route 204 to the target destination 208. The routing module 228 can also select the route 204 from the predicted point 226 as the origin or starting point of the route to the target destination 208.

A prediction module 230 can receive the route 204 from the routing module 228. The prediction module 230 can also receive the location reading 206. The prediction module 230 can verify whether the location reading 206 is consistent with the route 204, and can set an off-route flag 232 to indicate that the location reading 206 is not consistent with the route 204.

For example, the prediction module 230 can determine whether the navigation system 200 is no longer traversing the route 204, or is moving in a direction that is inconsistent with traversal of the route 204, or has stopped, or a combination thereof. If the prediction module 230 determines that the location reading 206 is not consistent with traversal of the route 204, then the prediction module 230 can generate the off-route flag 232.

If the prediction module 230 generates the off-route flag 232, the navigation system 200 can return to the routing module 228. The routing module 228 can generate a new version of the route 204 from the location reading 206 to the target destination 208. Also, in response to the off-route flag 232, the navigation system 200 can implement other processes such as displaying or sounding a warning.

The prediction module 230 can also receive the map data 202, the current speed 220, the current heading 222, and the time delay 234. As will be described later in more detail, the prediction module 230 can locate the predicted point 226 on the route 204. The time delay 234 is the time required by the prediction module 230 to receive the location reading 206, generate the navigation instruction 224, and display the navigation instruction 224. The time delay 234, the map data 202, the current speed 220 and the current heading 222 can be generated by another module of the navigation system 200, or received from another device, or a combination thereof.

The prediction module 230 can return the predicted point 226 to the routing module 228 to generate the route 204 using the predicted point 226 as the origin or starting point for the route 204. As will be described later in more detail, the prediction module 230 can also add modifications to the route 204.

The prediction module 230 can locate the predicted point 226 by projecting along thoroughfares of many geometric forms, including curved paths, winding roads, hilly roads, traffic circles or other. The prediction module 230 can accurately project along the route 204 by considering the curvature of a thoroughfare. The distance to the predicted point 226 is measured correctly by considering the curvature of the thoroughfare along the projection.

A guidance and display module 236 can receive the route 204 from the routing module 228, and the predicted point 226 from the prediction module 230. The guidance and display module 236 can generate the navigation instruction 224 relevant to the predicted point 226 and traversal of the route 204. The guidance and display module 236 can also display the navigation instruction 224 on the navigation system 200.

Figure 3:
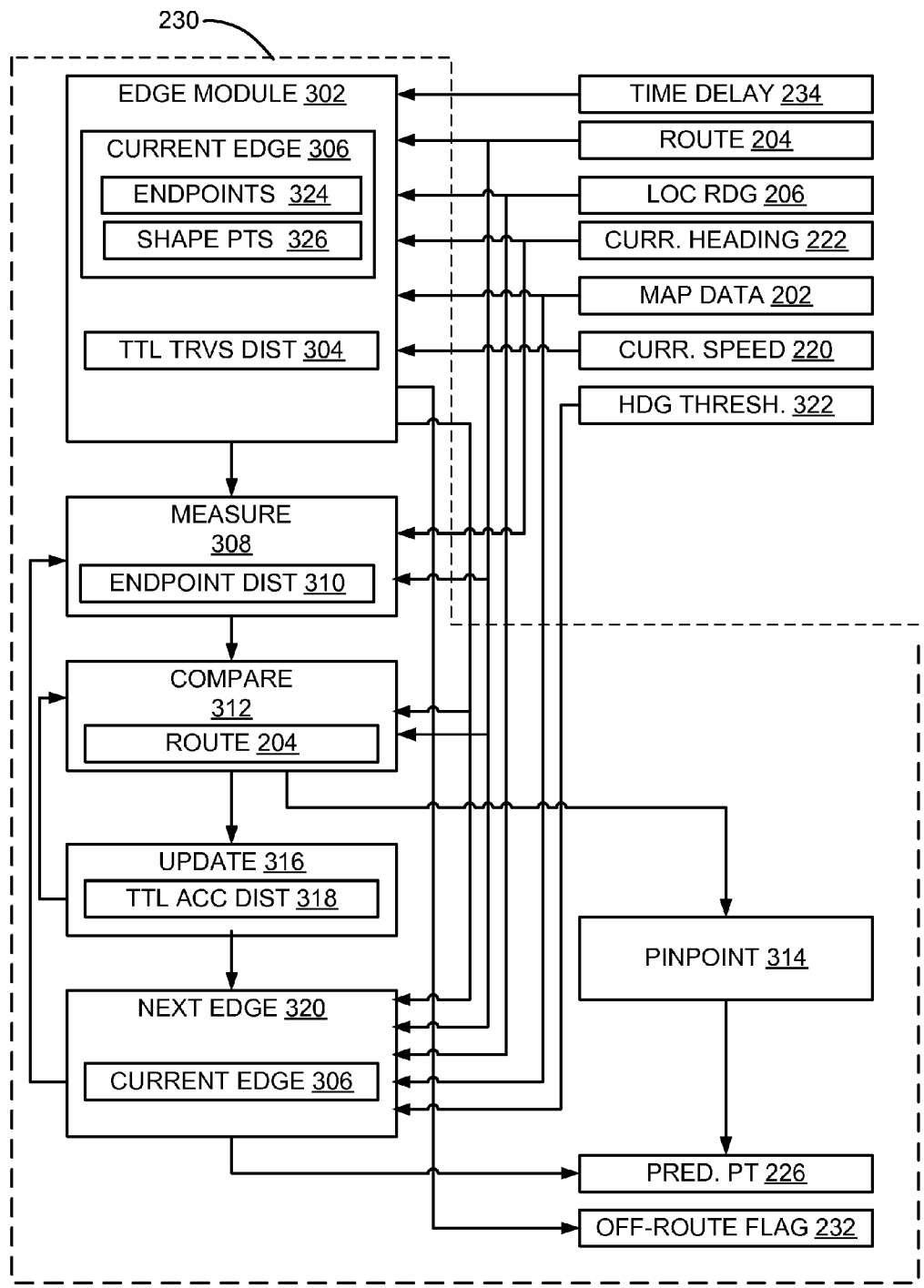
FIG. 3 is a flow chart of the prediction module of FIG. 2.

Referring now to FIG. 3, therein is shown a flow chart of the prediction module 230 of FIG. 2. The prediction module 230 can receive the route 204, the location reading 206, the map data 202, the current heading 222, and the current speed 220. The prediction module 230 can also receive the time delay 234 from another module of the navigation system 200 of FIG. 2, such as a storage module. The prediction module 230 can locate the predicted point 226. The prediction module 230 can also verify the location reading 206 on the route 204, and can generate the off-route flag 232 if the location reading 206 of the navigation system 200 is determined to be inconsistent with traversal of the route 204.

An edge module 302 can receive the route 204 from the routing module 228 of FIG. 2. The edge module 302 can also receive the location reading 206, the current heading 222, the map data 202 and the current speed 220. The location reading 206, the current heading 222 and the current speed 220 can be generated by another module of the navigation system 200. The map data 202 can be received from another module of the navigation system 200 such as a storage module. The edge module 302 can generate a total traversal distance 304 and a current edge 306 with endpoints 324 and shape points 326. The edge module 302 can also generate the off-route flag 232.

The total traversal distance 304 can be defined as the distance that the navigation system 200 can travel during the time delay 234. For example, for a device with the navigation system 200 traveling at a high speed on an interstate, the total traversal distance 304 will be relatively long, such as in a granularity of tenths of a mile. As another example, for a device traveling at a low speed through a residential neighborhood with traffic lights, the total traversal distance 304 will be relatively short, such as in a granularity of yards.

An edge such as the current edge 306 can be described as a road segment and can include the location reading 206. Those skilled in the art will appreciate that an edge or road segment can include, for example, end points, which define the geographic location of the ends of the edge or road segment. The edge or road segment in the map data 202 can also have the shape points 326, which can identify inflection points along the edge or road segment. For example, an edge that is curved can be described using the shape points 326 between two end points, such as the endpoints 324. As a further example, an edge or road segment can have a shape point to describe the beginning or the end of an incline.

A measure module 308 can receive the current edge 306 from the edge module 302 and can receive the location reading 206 and the current heading 222. The measure module can calculate an endpoint distance 310.

A compare module 312 can receive the endpoint distance 310 from the measure module 308 and the route 204. The compare module 312 can also receive the total traversal distance 304 from the edge module 302, and can receive a total accumulated distance 318. The compare module 312 can determine whether the predicted point 226 is on the current edge 306, and the navigation system 200 can go to a pinpoint module 314. The compare module 312 can also decide if the predicted point 226 is not on the current edge 306 and the navigation system 200 can go to an update module 316.

The total accumulated distance 318 can be used to identify the edge, which has the predicted point 226. The navigation system 200 can project along successive edges of the route 204 to locate the predicted point 226, which is at the total traversal distance 304 from the location reading 206. As the navigation system 200 projects along the edges of the route 204, the length of an edge can be added to the total accumulated distance 318 to monitor the distance examined until the predicted point 226 is located.

The compare module 312 can also modify the route 204. The compare module 312 can add the shape points 326 of the current edge 302 to the route 204. The shape points 326 of the current edge 302 can be locations along the projection from the location reading 206 to the predicted point 226.

The pinpoint module 314 can receive the current edge 306, the total accumulated distance 318 and the total traversal distance 304. The pinpoint module 314 can determine the location of the predicted point 226 on the current edge 306. The pinpoint module 314 can also reset the value of the total accumulated distance 318 to zero, to initialize the total accumulated distance 318 for operation of the prediction module 230 with another of the location reading 206.

The update module 316 can receive the total accumulated distance 318 and the endpoint distance 310. The update module 316 can update the value of the total accumulated distance 318 with the endpoint distance 310.

A next edge module 320 can receive the route 204, the current heading 222, the current edge 306, and the map data 202. The next edge module 320 can also receive a heading threshold 322 from storage or another module of the navigation system 200. As will be described in more detail, the next edge module 320 can locate the predicted point 226 at an endpoint 324 of the current edge 306. The next edge module 320 can also update the current edge 306 with another edge from the map data 202.

The edge module 302 can receive the route 204, the location reading 206, the current heading 222, the map data 202 and the current speed 220. The edge module 302 can compare the location reading 206 with the contents of the map data 202, and select the current edge 306 from the map data 202. The current edge 306 can have the endpoints 324 to describe the extent of the current edge 306. The current edge 306 can also have the shape points 326, which are located on the current edge 306 between the endpoints 324. The location of the shape points 326 can indicate the curvature of the current edge 306.

The edge module 302 can also determine whether the location reading 206 is consistent with traversing the route 204. If the location reading 206 is determined to be inconsistent with the route 204, the edge module 302 can set the off-route flag 232, and the navigation system 200 can return to the routing module 228 of FIG. 2 to revise the route 204.

If the edge module 302 determines that the location reading 206 is consistent with traversal of the route 204, the edge module 302 can calculate the total traversal distance 304 a number of ways. For example, the time delay 234 used in calculating the total traversal distance 304 can be a predetermined value, or estimated based on the complexity or distance of the route 204. The edge module 302 can calculate the total traversal distance 304 as the distance the navigation system 200 will traverse during the time delay 234. For example, the total traversal distance 304 can be calculated as a product of the current speed 220 and the time delay 234.

The measure module 308 can receive the current edge 306 from the edge module 302 and can receive the location reading 206 and the current heading 222. The measure module 308 can determine from the current heading 222 the direction, which the navigation system 200 is traversing along the current edge 306. The measure module 308 can calculate the endpoint distance 310, which is the distance from the location reading 206 to the endpoint 324 of the current edge 306, which the navigation system 200 is approaching.

The compare module 312 can receive the endpoint distance 310 from the measure module 308. The compare module 312 can also receive the total traversal distance 304 from the edge module 302, and can receive the total accumulated distance 318.

The compare module 312 can determine whether the predicted point 226 is on the current edge 306. The compare module 312 can compare the sum of the endpoint distance 310 and the total accumulated distance 318 with the total traversal distance 304. If the sum of the endpoint distance 310 and the total accumulated distance 318 is equal to or greater than the total traversal distance 304, then the predicted point 226 can be on the current edge 306. If the predicted point 226 is on the current edge 306, the navigation system 200 can go to the pinpoint module 314 to locate the predicted point 226.

If the compare module 312 determines that the predicted point 226 is not on the current edge 306, the navigation system 200 can go to the update module 316 to continue to identify an edge, which has the predicted point 226.

The pinpoint module 314 can receive the total accumulated distance 318 and the total traversal distance 304. The pinpoint module 314 can also receive the current edge 306 having the endpoint 324 and the shape points 326. The pinpoint module 314 can determine the location of the predicted point 226 on the current edge 306. The pinpoint module 314 can also reset the value of the total accumulated distance 318 to zero, to initialize the total accumulated distance 318 for operation of the prediction module 230 with another of the location reading 206.

Measuring from point to point along a curved thoroughfare can be inaccurate if the curvature of the thoroughfare is not considered. A straight-line measurement along a straight thoroughfare can be accurate for locating the predicted point 226. However, a straight-line measurement of the distance between two points on a curved thoroughfare can be inaccurate, because the measurement may not include the additional distance due to the curves of the thoroughfare. The curvature of the thoroughfare can also cause the predicted point 226 to be located on a wrong thoroughfare or locate generally in an incorrect location.

It has been discovered that the present invention provides a navigation system with a more reliable originating point and updates to the originating point for a route by locating the predicted point 226 using the shape points 326. The shape points 326 can make the prediction more reliable for the distance to the predicted point 226 and locating the predicted point 226 on the correct road segment.

The shape points 326 of the current edge 306 can define the curvature of the edge by identifying inflection points along the current edge 306. The prediction module 230 can measure the distance along the current edge 304 by measuring between the successive shape points 326. The use of the shape points 326 in the prediction also allow for reliable prediction along a curved or circular thoroughfare.

The pinpoint module 314 can calculate a distance along the current edge 306 to the location of the predicted point 226 by subtracting the total accumulated distance 318 from the total traversal distance 304. The pinpoint module 314 can measure the distance from the endpoint 324 to successive locations of the shape points 326 along the current edge 306 until the distance to the predicted point 226 along the current edge 306 has been consumed.

The update module 316 can receive the total accumulated distance 318 and the endpoint distance 310. The update module 316 can update the value of the total accumulated distance 318 with the endpoint distance 310.

The next edge module 320 can receive the route 204, the current heading 222, the current edge 306, and the map data 202. The next edge module 320 can also receive the heading threshold 322 from storage or another module of the navigation system 200, or from another device.

The heading threshold 322 is defined as a limit to the difference of two heading readings. For example, the current heading 222 can be compared with another heading to determine compliance with the heading threshold 322. The other heading can be determined to be beyond the heading threshold 322 if it differs from the current heading 222 by more than the heading threshold 322. For example, the other heading can be the heading of a device, or the heading of an edge from the map data 202 of the navigation system 200.

The next edge module 320 operates when the compare module 312 determines that the predicted point 226 is not on the current edge 306. The next edge module 320 can identify a further edge, which the navigation system 200 can project along for the purpose of locating the predicted point 226. The next edge module 320 can update the current edge 306, and the navigation system 200 can return to the measure module 308. If the next edge module 320 does not determine a further edge, the next edge module 320 can determine that the predicted point 226 is at the endpoint of the current edge 306.

Figure 4:
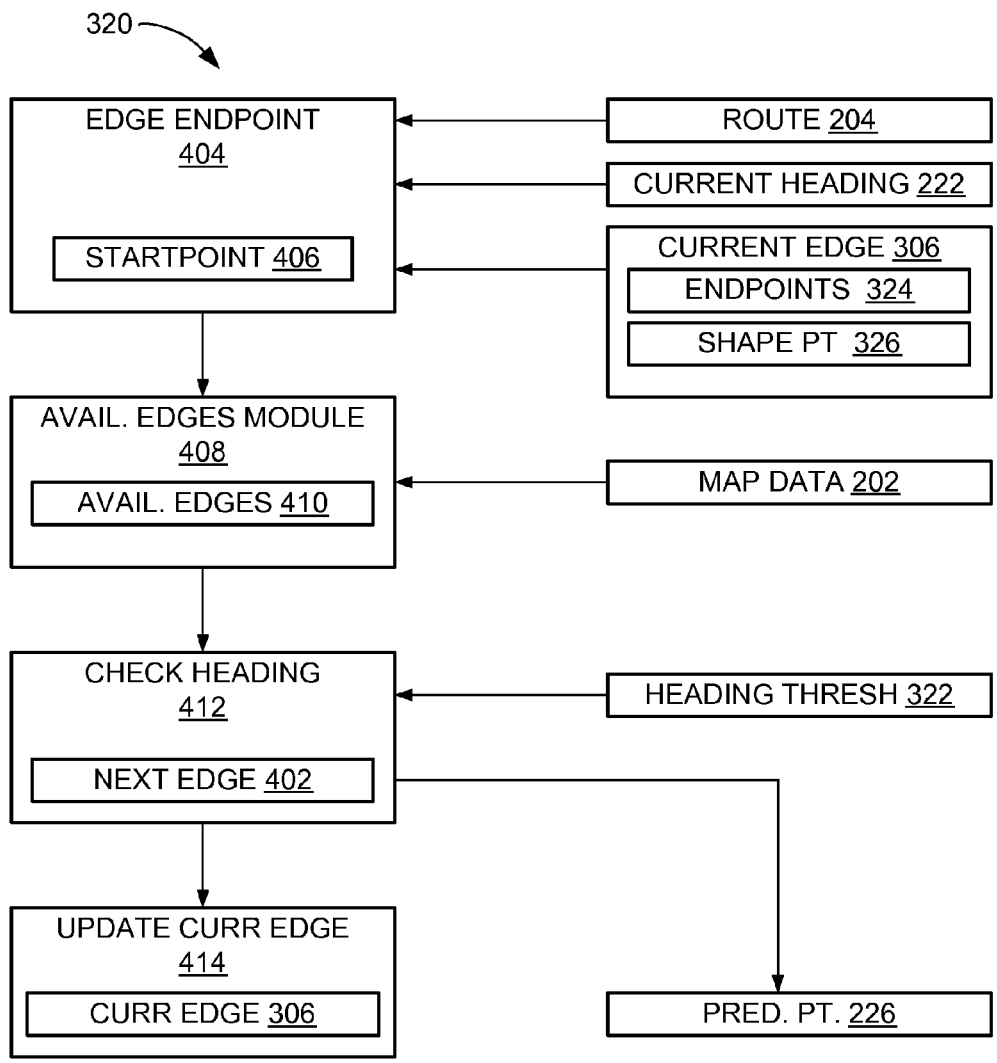
FIG. 4 is a flow chart of the next edge module of FIG. 3.

Referring now to FIG. 4, therein is shown a flow chart of the next edge module 320 of FIG. 3. Until the predicted point 226 is located, the next edge module 320 can identify a next edge 402, which the navigation system 200 of FIG. 2 will project along to locate the predicted point 226. If the next edge module 320 cannot determine the next edge 402, the next edge module 320 can locate the predicted point 226 at the endpoint 324 of the current edge 306.

An edge endpoint module 404 can receive the route 204, the current heading 222, and the current edge 306. The edge endpoint module 404 locates a startpoint 406 of the next edge 402, which is the endpoint 324 of the current edge 306.

An available edges module 408 can receive the startpoint 406 from the edge endpoint module 404, and can receive the map data 202. The available edges module 408 can select available edges 410 from the map data 202.

A check heading module 412 can receive the heading threshold 322, the current heading 222, and the available edges 410. The check heading module 412 can decide to operate an update current edge module 414, or to set the location of the predicted point 226 at the startpoint 406.

The update current edge module 414 can receive the next edge 402 and save it as the current edge 306.

The available edges module 408 can receive the startpoint 406 from the edge endpoint module 404, and can receive the map data 202. The available edges module 408 can select the available edges 410 from the map data 202. The available edges 410 can include edges that connect to the current edge 306. The available edges 410 can be described as edges that have an endpoint 324 at the location of the startpoint 406.

The check heading module 412 can receive the heading threshold 322, the current heading 222, and the available edges 410. The check heading module 412 compares the heading of the available edges 410 with the current heading 222, which is associated with the current edge 306. The check heading module 412 determines whether the difference of the heading of each edge of the available edges 410 and the current heading 222 is within the heading threshold 322.

The check heading module 412 can select an edge from the available edges as the next edge 402. If one edge of the available edges 410 has the startpoint 406 as the endpoint 324, and it is within the heading threshold 322 of the current heading 222, then the check heading module can set that edge as the next edge 402.

If more than one edge of the available edges 410 has the startpoint 406 as the endpoint 324 and is within the heading threshold 322 of the current heading 222, then the check heading module 412 can set the location of the predicted point 226 at the endpoint 324.

If no edge of the available edges 410 has the startpoint 406 as the endpoint 324 and is within the heading threshold 322 of the current heading 222, then the check heading module 412 can set the location of the predicted point 226 at the endpoint 324.

The next edge module 320 returns either the predicted point 226 or another of the current edge 306 to the prediction module 230 of FIG. 2.

Figure 5:
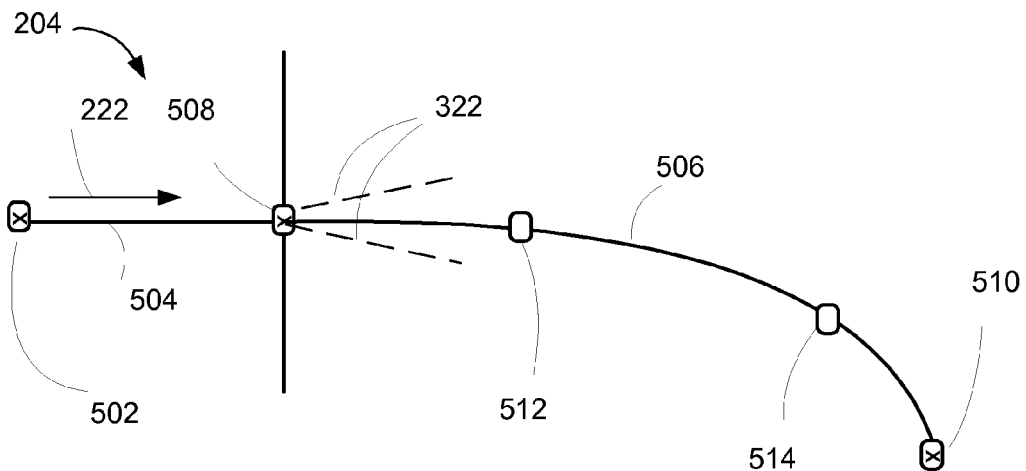
FIG. 5 is a geographic view of an example application of the navigation system of FIG. 2.

Referring now to FIG. 5, therein is shown a geographic view of an example application of the navigation system 200 of FIG. 2. FIG. 5 shows a diagram of a navigation route such as the route 204, and a device 502 having the navigation system 200.

The geographic view depicts the device 502 at a location such as the location reading 206 of FIG. 2 traversing the route 204. The route 204 can include edges such as an edge one 504 and an edge two 506, which have an endpoint one 508 as a common end point. The current heading 222 of the device 502 on the edge one 504 is indicated by an arrow. The route 204 can be generated by other functions of the navigation system 200 or another device.

For illustrative purposes, the route 204 is shown with the edge one 504 as a linear or straight road segment, and with the edge two 506 as a curved road segment. However, it is understood that the navigation system 200 can operate with the edges of the route 204 having multiple curved portions, linear portions, traffic circles, or roads with a dead-end.

The device 502 with the navigation system 200 can receive the location reading 206 as a current location of the device 502. The navigation system 200 can generate an instruction, such as the navigation instruction 224 of FIG. 2, after the time delay 234 of FIG. 2 for display on the device 502. The navigation system 200 can project the predicted point 226 of FIG. 2, which will be the location of the device 502 after the time delay 234, and the navigation instruction 224 can be associated with the predicted point 226.

The navigation system 200 can set the edge one 504 as the current edge 306 of FIG. 3, and can calculate the total traversal distance 304 of FIG. 3. From the current heading 222 of the device 502, the measure module 308 of FIG. 3 can calculate the distance from the location reading 206 to the endpoint one 508 as the endpoint distance 310 of FIG. 3. The compare module 312 of FIG. 3 can compare the total traversal distance 304 with the sum of the total accumulated distance 318 and the endpoint distance 310. The compare module 312 can determine that the predicted point 226 can be beyond the endpoint one 508 of the current edge 306, and can project along another edge to locate the predicted point 226.

The update module 316 of FIG. 3 can update the total accumulated distance 318 by adding the endpoint distance 310 to the total accumulated distance 318. The next edge module 320 of FIG. 3 can determine the next edge 402 of FIG. 4, and can set the next edge 402 as the current edge 306.

The next edge 402 can be an edge with the endpoint one 508 as an endpoint, and is within the heading threshold 322, depicted in FIG. 5 as the dotted lines. For example, the next edge module 320 can select the edge two 506 as the next edge 402, and update the current edge 306 with the next edge 402. The navigation system 200 can return to the measure module 308.

The next edge module 320 can also determine that the predicted point 226 can be the endpoint one 508. For example, if the next edge module 320 determines that edges with an end point at the endpoint one 508 are outside the heading threshold 322, then the next edge 402 can set the predicted point 226 at the endpoint one 508 and the navigation system 200 can go to the guidance and display module 236.

As a further example, if the next edge module 320 determines that more than one edge with an end point at the endpoint one 508 can be within the heading threshold 322 of the current heading 222, then the next edge module 320 can set the predicted point 226 at the endpoint one 508. For example, if the current edge 306 ends at a T-junction, the next edge 402 can determine that there are no edges within the heading threshold 322 other than the current edge 306. As a further example, if the current edge 306 ends in a dead-end, the next edge module 320 can determine that the predicted point 226 is at the endpoint one 508.

If the next edge module 320 selects the edge two 506 as the next edge 402, and sets the next edge 402 as the current edge 306, the measure module 308 can calculate the distance from the endpoint one 508 to an endpoint two 510 as the endpoint distance 310 of the current edge 306. The compare module 312 can compare the total traversal distance 304 with the sum of the total accumulated distance 318 and the endpoint distance 310, and determine that the edge two 506 can include the predicted point 226. The navigation system 200 can go to the pinpoint module 314 to determine the location of the predicted point 226 on the edge two 506.

The pinpoint module 314 can receive the endpoint and shape points of the current edge 306. The pinpoint module can read the endpoint one 508 and the endpoint two 510 as the endpoints of the edge two 506, and a shape point one 512 and a shape point two 514 as shape points on the edge two 506. The pinpoint module 314 can add the distance from the endpoint one 508 to the shape point one 512 to the total accumulated distance 318. If the sum of the distance from the endpoint one 508 to the shape point one 512 and the total accumulated distance 318 is less than the total traversal distance 304, then the predicted point 226 can be located beyond the shape point one 512.

The pinpoint module 314 can add the distance from the endpoint one 508 to the shape point one 512, and from the shape point one 512 to the shape point two 514, and the total accumulated distance 318. If the sum of the distance from the endpoint one 508 to the shape point one 512, and from the shape point one 512 to the shape point two 514 and the total accumulated distance 318 equals or exceeds the total traversal distance 304, then the predicted point 226 can be located at or before the shape point two 514. The navigation system 200 can operate the guidance and display module 236 to generate the navigation instruction 224 relevant to the route 204 and the predicted point 226 at the shape point two 514 or between the shape point one 512 and the shape point two 514.

The compare module 312 can add the shape point one 512 and the shape point two 514 to the route 204. The shape point one 512 and the shape point two 514 are points along the projection from a location reading of the device 502 to the predicted point 226, and can be part of the route 204.

It has been discovered that the present invention provides a navigation system with increased reliability and accuracy of the route 204 by including the shape point one 512 and the shape point two 514 along the prediction. The prediction can include turns and curves. The inclusion of these points describes the route 204 more accurately while preventing possible deviations with the inclusion.

The pinpoint module 314 can measure incrementally along the shape points of an edge to include the distance along road segments with curves or other irregular shapes. The pinpoint module 314 can project around a curved path or other irregular shaped thoroughfare by considering shape points such as the shape point one 512 and the shape points two 514 to include the curvature of the thoroughfare.

Figure 6:
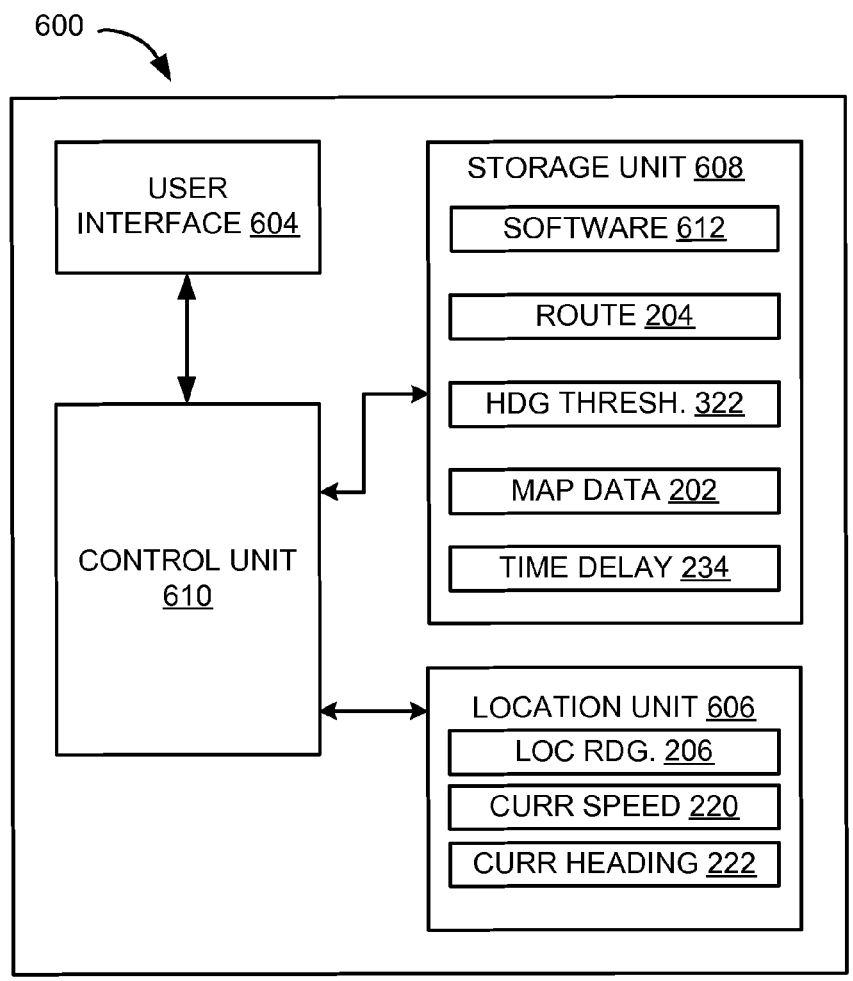
FIG. 6 is a block diagram of a navigation system with path prediction in a second embodiment of the present invention.

Referring now to FIG. 6, therein is shown a block diagram of a navigation system 600 with path prediction in a second embodiment of the present invention. The navigation system 600 can be the second device 104 of FIG. 1. For example, the navigation system 600 can be any of a variety of devices, such as a cellular phone, a personal digital assistant, a notebook computer, or an entertainment device. The navigation system 600 can be a standalone device, or can be incorporated with a vehicle, for example a car, truck, bus, or train.

The navigation system 600 can include a user interface 604, a location unit 606, a storage unit 608 and a control unit 610, such as a processor. The user interface 604 can include an input device and an output device. For example, the output device can include a display, a projector, a video screen, a speaker, or any combination thereof. Examples of the input device include a keypad, a touchpad, soft-keys, a keyboard, a microphone, or any combination thereof to provide data and communication inputs.

The control unit 610 can execute software 612 and can provide the intelligence of the navigation system 600. As an example, the software 612 can include the navigation system 200 of FIG. 2. The control unit 610 can operate the user interface 604 to display information generated by the navigation system 600. The control unit 610 can also execute the software 612 for the other functions of the navigation system 600, including receiving location information from the location unit 606.

The control unit 610 can receive the target destination 208 of FIG. 2 from the user interface 604 and the location reading 206, and operate the routing module 228 of FIG. 2 to select the route 204. The control unit 610 can also send the route 204 to the storage unit 608 to be stored for use by other functions of the navigation system 600. The control unit 610 can also receive the current speed 220, the current heading 222 and the time delay 234, and can operate the prediction module 230 of FIG. 2 to determine the location of the predicted point 226 of FIG. 2. The control unit 610 can also operate the prediction module 230 to generate the off-route flag 232 of FIG. 2 if the location reading 206 is determined to be inconsistent with the route 204.

The control unit 610 can also operate the guidance and display module 236 of FIG. 2. The guidance and display module 236 can generate the navigation instruction 224 of FIG. 2 for display on the user interface 604.

The routing module 228 can operate the location unit 606 of the navigation system 600 to generate the location reading 206, the current heading 222 and the current speed 220 of the navigation system 600. The location unit 606 can be implemented in many ways. For example, the location unit 606 can be a global positioning system (GPS), inertial navigation system, cell-tower location system, accelerometer location system, or any combination thereof.

The storage unit 608 can store the software 612, setup data, and other data for the operation of the navigation system 600. The storage unit 608 can also store the relevant information, such as advertisements, points of interest (POI), navigation routing entries, or any combination thereof. For example, the storage unit 608 can include navigation routing information.

The storage unit 608 can also receive and store the route 204 selected by the routing module 228. The storage unit 608 can also store the map data 202, which can include edge information such as the current edge 306 of FIG. 3, with the endpoint 324 of FIG. 3 and the shape points 326 of FIG. 3. The storage unit 608 can also store the heading threshold 322 and the time delay 234. The control unit 610 can operate on the data of the storage unit 608 to execute the functions of the navigation system 600.

The control unit 610 can operate the functions of the navigation system 600 to locate the predicted point 226, generate the navigation instruction 224 relevant to the predicted point 226 and traversal of the route 204, and display the navigation instruction 224 on the user interface 604.

Figure 7:
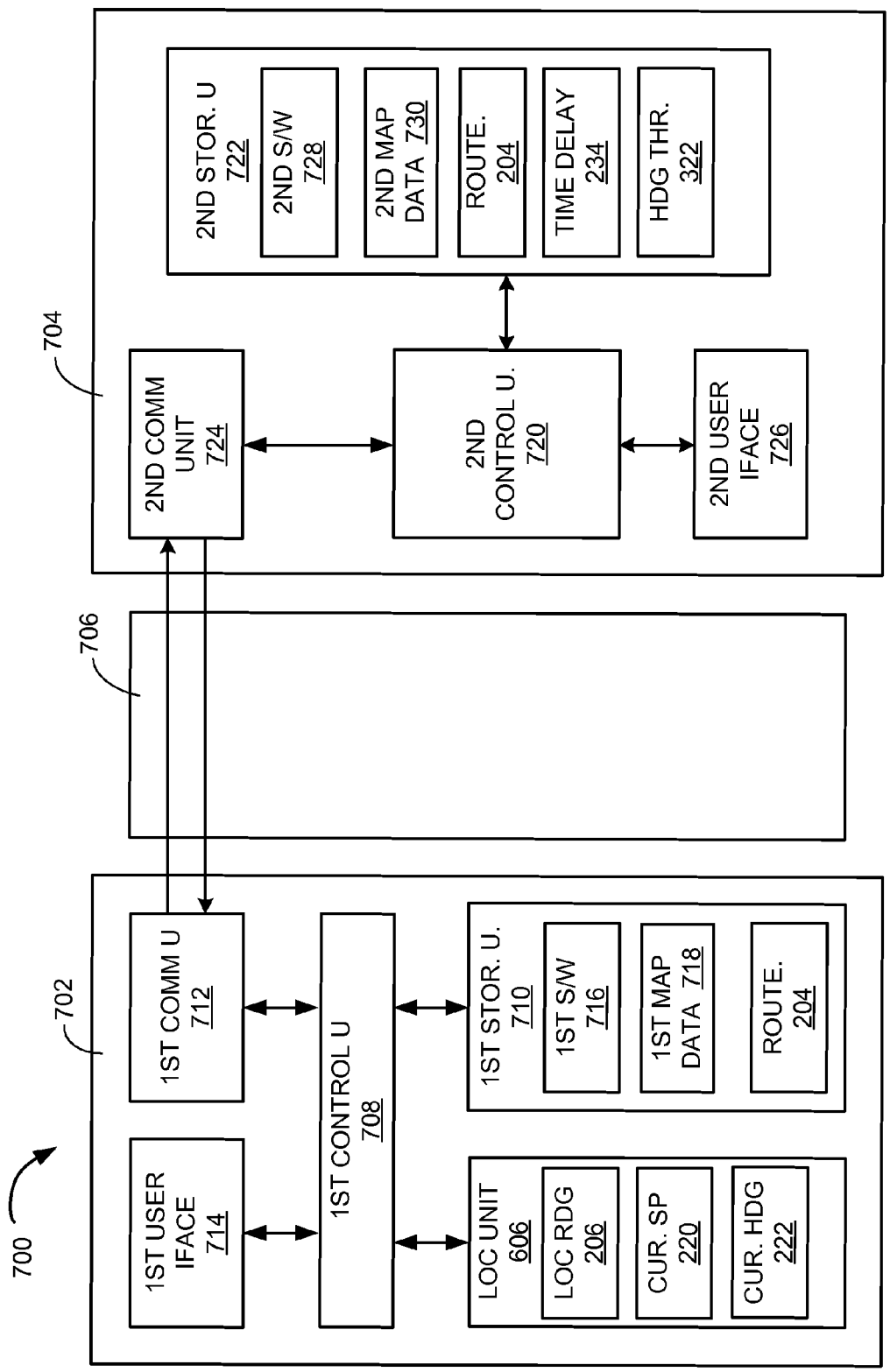
FIG. 7 is a block diagram of a navigation system with path prediction in a third embodiment of the present invention.

Referring now to FIG. 7, therein is shown a block diagram of a navigation system 700 with path prediction in a third embodiment of the present invention. The navigation system 700 can include a first device 702, a second device 704, and a communication path 706. The first device 702 can communicate with the second device 704 over the communication path 706.

For illustrative purposes, the navigation system 700 is shown with the first device 702 as a client, although it is understood that the navigation system 700 can have the first device 702 as a different type of device. For example, the first device 702 can be a server.

Also for illustrative purposes, the navigation system 700 is shown with the second device 704 as a server, although it is understood that the navigation system 700 can have the second device 704 as a different type of device. For example, the second device 704 can be a client.

For brevity of description for this embodiment of the present invention, the first device 702 will be described as a client device and the second device 704 will be described as a server device. The present invention is not limited to this selection for the type of devices. The selection is an example of the present invention.

The first device 702 can include, for example, a first control unit 708, such as a processor, a first storage unit 710, a first communication unit 712, the location unit 606, and a first user interface 714. For illustrative purposes, the navigation system 700 is shown with the first device 702 described with discrete functional modules, although it is understood that the navigation system 700 can have the first device 702 in a different configuration. For example, the first control unit 708, the first communication unit 712, the first user interface 714 may not be discrete functional modules, but may have one or more of the aforementioned modules combined into one functional module.

The first control unit 708 can execute first software 716 from the first storage unit 710 and provide the intelligence of the first device 702. As an example, the first software 716 can include a portion of the navigation system 200 of FIG. 2. The first control unit 708 can operate the first user interface 714 to display information generated by the navigation system 700. The first control unit 708 can also execute the first software 716 for the other functions of the navigation system 700.

The first storage unit 710 can be implemented in a number of ways. For example, the first storage unit 710 can be a volatile memory, a nonvolatile memory, an internal memory, or an external memory. The first storage unit 710 can include the first software 716, first map data 718, and the route 204. The first map data 718 can be a portion of the map data 202 of FIG. 2.

The first user interface 714 can include an output device and an input device. For example, the output device can include a projector, a video screen, a speaker, or any combination thereof. Examples of the input device include a keypad, a touchpad, soft-keys, a keyboard, a microphone, or any combination thereof to provide data and command inputs. The first user interface 714 can receive input to the first device 702, such as the target destination 208 of FIG. 2.

The location unit 606 of the first device 702 can generate the location reading 206, the current heading 222 and the current speed 220 of the first device 702. The location unit 606 can be implemented in many ways. For example, the location unit 606 can be a global positioning system (GPS), inertial navigation system, cell-tower location system, accelerometer location system, or any combination thereof.

The first communication unit 712 can include active and passive components, such as microelectronics or an antenna, for interaction with the communication path 706. The first control unit 708 can execute the first software 716 and can provide the intelligence of the first device 702 for interaction with the second device 704, the first user interface 714, the communication path 706 via the first communication unit 712, and interaction to the location unit 606.

The second device 704 can include, for example, a second control unit 720, such as a processor or computer, a second storage unit 722, a second communication unit 724, and a second user interface 726. For illustrative purposes, the navigation system 700 is shown with the second device 704 described with discrete functional modules, although it is understood that the navigation system 700 can have the second device 704 in a different configuration. For example, the second control unit 720, the second communication unit 724, and the second user interface 726 may not be discrete functional modules, but may have one or more of the aforementioned modules combined into one functional module.

The second storage unit 722 can include second software 728 of the second device 704, second map data 730, and the route 204. The second storage unit 722 can also include the time delay 234 and the heading threshold 322. The second map data 730 can be a portion of the map data 202. As an example, the second software 728 can include a portion of the navigation system 700. For illustrative purposes, the second storage unit 722 is shown as a single element, although it is understood that the second storage unit 722 can be a distribution of storage elements.

Also for illustrative purposes, the navigation system 700 is shown with the second storage unit 722 as a single hierarchy storage system, although it is understood that the navigation system 700 can have the second storage unit 722 in a different configuration. For example, the second storage unit 722 can be formed with different storage technologies forming a memory hierarchal system including different levels of caching, main memory, rotating media, or off-line storage.

The first map data 718 can cooperate with the second map data 730. For example, the second map data 730 can contain information covering a wide area such as road maps for a country, while the first map data 718 can contain information covering a smaller area, such as a number of counties or municipalities, or other.

The second control unit 720 can execute the second software 728 and provide the intelligence of the second device 704 for interaction with the first device 702, the second user interface 726 and the communication path 706 via the second communication unit 724. As an example, the second software 728 can include a portion of the navigation system 200.

The first communication unit 712 can couple with the communication path 706 to send information to the second device 704. The second device 704 can receive information from the communication path 706 in the second communication unit 724.

The second communication unit 724 can couple with the communication path 706 to send information to the first device 702. The first device 702 can receive information from the communication path 706 in the first communication unit 712.

The navigation system 700 can be executed by the first control unit 708, the second control unit 720, or a combination thereof.

The location unit 606 can generate the location reading 206, the current speed 220 and the current heading 222 of the first device 702. The first control unit 708 can receive the location reading 206, the current speed 220 and the current heading 222 from the location unit 606. The first control unit 708 can also receive a target destination 208 from the first user interface 714 in a request for navigation information. The first control unit 708 can operate the first communication unit 712 to send information including the request for navigation information across the communication path 706. The first communication unit 712 can send the location reading 206, the current speed 220, the current heading 222 and the target destination 208 across the communication path 706.

The second communication unit 724 can receive the information from the communication path 706 including the request for navigation information. The second control unit 720 can receive the location reading 206 and the target destination 208 from the second communication unit 724. The second control unit 720 can operate the routing module 228 of FIG. 2 from the second software 728 to select the route 204 using the second map data 730. The second control unit 720 can store the route 204 in the second storage unit 722. The second control unit 720 can also operate the second communication unit 724 to send the route 204 across the communication path 706 to the first device 702.

The first control unit 708 can operate the first user interface 714 to display information from the route 204 on a display element.

The second control unit 720 can operate the prediction module 230 of FIG. 2. Using the route 204 and the location reading 206, the prediction module 230 can determine whether the location reading 206 is consistent with traversal of the route 204. If the prediction module 230 determines that the location reading 206 is not consistent with traversal of the route 204, the prediction module 230 can set the off-route flag 232 of FIG. 2, and the navigation system 700 can operate the routing module 228 to select a new route.

The second control unit 720 can operate the prediction module 230 to locate the predicted point 226 of FIG. 2. The second control unit 720 can operate the edge module 302 of FIG. 3 from the second software 728 to select the current edge 306 of FIG. 3 with the shape points 326 of FIG. 3 and the endpoint 324 of FIG. 3. The edge module 302 can also receive the time delay 234 of FIG. 3 from the second storage unit 722, calculate the total traversal distance 304, and store the total traversal distance 304 in the second storage unit 722.

The second control unit 720 can operate the measure module 308 to generate the endpoint distance of FIG. 3. The second control unit 720 can receive the total accumulated distance 318 from the second storage unit 722, and operate the compare module 312 to determine whether the current edge 306 includes the predicted point 226. If the current edge 306 does not include the predicted point 226, the second control unit 720 can operate the update module 316 and the next edge module 320 to continue to locate the predicted point 226.

If the compare module 312 determines that the predicted point 226 is on the current edge 306, the second control unit can operate the pinpoint module 314 to locate the predicted point 226. The pinpoint module 314 can project along the shape points 326 of the current edge 306 until the predicted point 226 is located on the current edge 306.

The second control unit 720 can operate the second communication unit 724 to send the predicted point 226 across the communication path 706 to the first device 702. The first communication unit 712 can receive the predicted point 226 from the communication path 706.

The first control unit 708 can receive the predicted point 226 from the first communication unit 712. The first control unit 708 can also receive the route 204 from the first storage unit 710 and can operate the guidance and display module 236 to generate the navigation instruction 224 of FIG. 2. The guidance and display module 236 can also operate the first user interface 714 to display the navigation instruction 224 on a display of the first user interface 714.

For illustrative purposes, the navigation system 700 is shown with the first map data 718 in the first device 702, and the second map data 730 in the second device 704, although it is understood that the navigation system 700 can include a different partition for the map data 202. For example, the navigation system 700 can have the first map data 718 or the second map data 730 as optional.

Also for illustrative purposes, the navigation system 700 is shown with the modules of the navigation system 200 operated by the first device 702 or the second device 704. It is to be understood that the first device 702 and the second device 704 can operate any of the modules and functions of the navigation system 200.

For example, the first device 702 is shown to operate the guidance and display module 236, although it is understood that the second device 704 can also operate the guidance and display module 236. As a further example, the second device 704 is shown to operate the prediction module 230 although it is understood that the first device 702 can also operate the prediction module 230.

Figure 8:
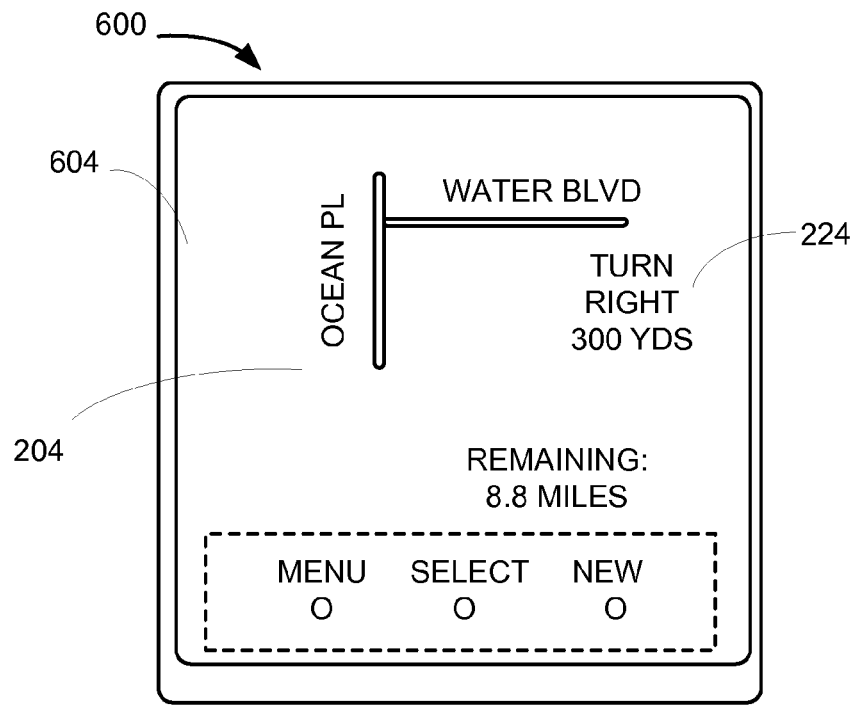
FIG. 8 is an illustration of an example of the navigation system of FIG. 6 with path prediction.

Referring now to FIG. 8, therein is shown an illustration of an example of the navigation system 600 of FIG. 6 with path prediction. The navigation system 600 is shown with the user interface 604.

The user interface 604 displays a street map on a multimedia display interface of the navigation system 600, as the navigation system 600 traverses the route 204 of FIG. 2. The display shows a street map with turn guidance such as the navigation instruction 224. In this example, the navigation instruction 224 includes an instruction to make a turn after a given distance. The example also shows the names of the streets on the route 204. The navigation instruction 224 is generated by the navigation system 600 so that the navigation instruction 224 is associated with the predicted point 226 of FIG. 2 instead of the location reading 206 of FIG. 2.

The navigation system 600 can determine if the location reading 206 is inconsistent with traversal of the route 204. For example, the navigation system can make an unscheduled turn off the route 204, and the navigation system 600 can calculate a new version of the route 204 to a destination such as the target destination 208 of FIG. 2 to compensate for the unscheduled turn. An unscheduled turn off the route 204 can include making an incorrect turn, making an unplanned detour, such as a U-turn, or making a stop at an unplanned point of interest.

Figure 9:
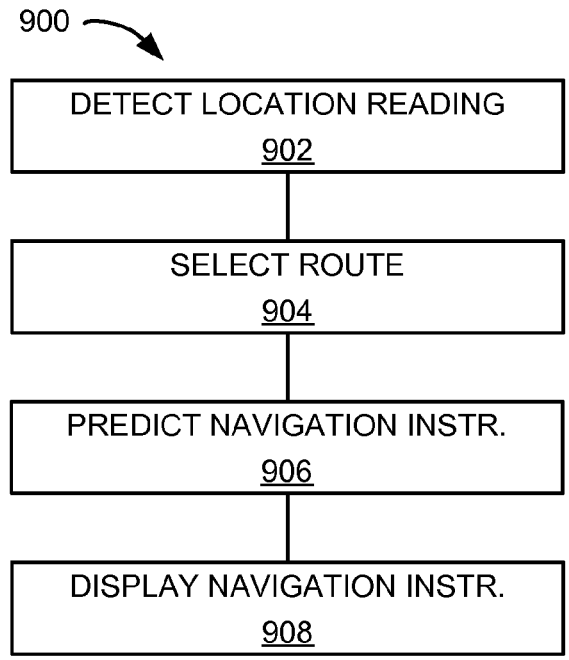
FIG. 9 is a flow chart of a method of operation of the navigation system having path prediction in a further embodiment of the present invention.

Referring now to FIG. 9, therein is shown a flow chart of a method 900 of operation of the navigation system 200 having path prediction in a further embodiment of the present invention. The method 900 includes: detecting a location reading in a module 902; selecting a route in a module 904; predicting a navigation instruction based on a calculation with the location reading, the shape point and a time delay for the calculation in a module 906; and displaying the navigation instruction on a device in a module 908.

Yet another important aspect of the present invention is that it valuably supports and services the historical trend of reducing costs, simplifying systems, and increasing performance. These and other valuable aspects of the present invention consequently further the state of the technology to at least the next level.

Thus, it has been discovered that the navigation system of the present invention furnishes important and heretofore unknown and unavailable solutions, capabilities, and functional aspects for improving performance, increasing reliability, increasing safety and reducing cost of using a mobile client having location based services capability. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations can be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:

detecting a location reading;
selecting a route having a current edge with an endpoint and a shape point, the shape point for identifying an inflection point describing the beginning or the end of an incline;
predicting a navigation instruction based on a calculation with the location reading, the shape point, and a time delay for the calculation; and
displaying the navigation instruction on a device.

2. The method as claimed in claim 1 wherein predicting a navigation instruction based on a calculation with the location reading, the shape point, and a time delay for the calculation includes measuring to the shape point on the current edge which is a curved road segment.

3. The method as claimed in claim 1 further comprising:
setting an off-route flag based on the location reading and the route; and
updating the route based on the location reading and the off-route flag.

4. The method as claimed in claim 1 further comprising:
receiving a current speed and a current heading associated with the location reading;
calculating a predicted point on the current edge with the shape point and the endpoint based on the time delay for the calculation and a total traversal distance; and
predicting the navigation instruction associated with the predicted point on the route.

5. The method as claimed in claim 1 further comprising:
calculating a predicted point on the current edge with the shape point and the endpoint; and
selecting the current edge with the predicted point based on a current heading, a heading threshold and a total accumulated distance.

6. A method of operation of a navigation system comprising:
detecting a location reading;
selecting a route having a current edge with an endpoint and a shape point, the shape point for identifying an inflection point describing the beginning or the end of an incline;
predicting a navigation instruction based on a calculation with the location reading, the shape point, and a time delay for the calculation;
determining a total traversal distance to a predicted point based on the time delay, a current speed, and a current heading;
selecting another of the current edge with the predicted point; and
displaying the navigation instruction on a device.

7. The method as claimed in claim 6 wherein selecting the current edge with the predicted point includes measuring the distance to the predicted point at the shape point or between shape points along the current edge with the current heading within a heading threshold.

8. The method as claimed in claim 6 wherein selecting another of the current edge with the predicted point includes:
calculating a distance to the endpoint of the current edge and a total accumulated distance for determining the predicted point is not on the current edge;
updating the total accumulated distance; and
selecting a next edge.

9. The method as claimed in claim 6 further comprising selecting the predicted point at the endpoint of the current edge based on the current heading and a heading threshold.

10. The method as claimed in claim 6 wherein predicting the navigation instruction includes locating the predicted point based on the route.

11. A navigation system comprising:
a location unit for detecting a location reading;
a routing module, coupled with the location unit, for selecting a route having a current edge with an endpoint and a shape point, the shape point for identifying an inflection point describing the beginning or the end of an incline;
a prediction module, coupled with the routing module, for predicting a navigation instruction based on a calculation with the location reading, the shape point, and a time delay for the calculation; and
a guidance and display module, coupled with the prediction module, for displaying the navigation instruction on a device.

12. The system as claimed in claim 11 wherein the prediction module is for predicting the navigation instruction based on a calculation with the location reading, the shape point, and a time delay for the calculation includes measuring to the shape point on the current edge which is a curved road segment.

13. The system as claimed in claim 11 wherein:
the prediction module is for setting an off-route flag based on the location reading and the route; and
the routing module is for updating the route based on the location reading and the off-route flag.

14. The system as claimed in claim 11 wherein:
the location unit is for receiving a current speed and a current heading associated with the location reading;
the prediction module is for calculating a predicted point on the current edge based on the time delay, the current speed, and the current heading; and
the guidance and display module is for predicting the navigation instruction associated with the predicted point on the route.

15. The system as claimed in claim 11 wherein the prediction module includes:
a pinpoint module for calculating a predicted point on the current edge with the shape point and the endpoint; and
a next edge module for selecting the current edge with the predicted point based on a current heading, a heading threshold and a total accumulated distance.

16. The system as claimed in claim 11 wherein the prediction module includes an edge module for selecting another of the current edge with a predicted point and for determining a total traversal distance to the predicted point based on the time delay, a current speed, and a current heading.

17. The system as claimed in claim 16 wherein the prediction module is for measuring the distance to the predicted point at the shape point or between shape points along the current edge provided by the edge module with the current heading within a heading threshold.

18. The system as claimed in claim 16 wherein the prediction module includes:
a measure module for calculating a distance to the endpoint of the current edge;
a compare module, coupled with the measure module, for determining a total accumulated distance for determining the predicted point is not on the current edge;
an update module, coupled to the compare module, for updating the total accumulated distance; and
a next edge module, coupled with the update module, for selecting another of the current edge.

19. The system as claimed in claim 16 wherein the prediction module is for selecting the predicted point at the endpoint of the current edge based on the current heading and the heading threshold.

20. The system as claimed in claim 16 wherein the guidance and display module is for predicting the navigation instruction by locating the predicted point based on the route.

* * * * *